United States Patent [19]

Hirai et al.

[11] Patent Number: 5,247,108

[45] Date of Patent: Sep. 21, 1993

[54] ELECTRIC CONTACT FAILURE-PROOF OIL AND METHOD FOR PREVENTING ELECTRIC CONTACT FAILURE

[75] Inventors: Motohiko Hirai, Annaka; Takahiro Goi, Gunma, both of Japan

[73] Assignee: Shin-Etsu Chemical Co., Ltd., Tokyo, Japan

[21] Appl. No.: 942,179

[22] Filed: Sep. 9, 1992

[30] Foreign Application Priority Data

Sep. 9, 1991 [JP] Japan .................. 3-257068

[51] Int. Cl.$^5$ .............................. C07F 7/10
[52] U.S. Cl. ...................... 556/413; 556/417; 106/287.11; 174/137 A; 528/32
[58] Field of Search ............... 556/413, 417; 106/287.11; 174/137 A; 528/32

[56] References Cited

U.S. PATENT DOCUMENTS

| | | | |
|---|---|---|---|
| 4,695,617 | 9/1987 | Inoue et al. | 528/32 |
| 5,087,715 | 2/1992 | Snow | 556/413 |
| 5,107,008 | 4/1992 | Revis et al. | 556/413 X |

FOREIGN PATENT DOCUMENTS 0392707 10/1990 European Pat. Off. .
882054 11/1961 United Kingdom .

*Primary Examiner*—Arthur C. Prescott
*Attorney, Agent, or Firm*—Birch, Stewart, Kolasch & Birch

[57] ABSTRACT

An oil comprising an amino-modified silicone fluid containing an amino group with an amine equivalent of 10,000 to 200,000 g/mol and having a viscosity of 10 to 100,000 centistokes at 25° C. is effective in preventing any electric contact failure in relays, switches, motors, corotrons and similar electric elements.

15 Claims, No Drawings

ELECTRIC CONTACT FAILURE-PROOF OIL AND METHOD FOR PREVENTING ELECTRIC CONTACT FAILURE

TECHNICAL FIELD

This invention relates to an electric contact failure-proof oil and more particularly, to an oil for use in electric and electronic equipment for moisture resistant, insulating, cooling, lubricating and releasing purposes.

BACKGROUND OF THE INVENTION

Silicone fluids as typified by dimethylpolysiloxane have improved heat resistance, low-temperature resistance, weather resistance and stable electrical properties and are used in a variety of applications including electric appliances, business machines and computer-related machines for moisutre resistant, insulating, cooling, lubricating and other purposes. At present, silicone fluids are indispensable for ensuring the reliability and function of such electric and electronic equipment.

In accordance with the demand for enhancing the function and reducing the size of such electric and electronic equipment, it is desired to reduce the contact pressure and actuating load energy of switches, relays and other elements, leaving the risk of interruption and malfunction of these elements. One of indirect causes is electric contact failures in elements such as relays, switches, motors and corotrons. It is known that electric contact failures are sometimes caused by low molecular weight siloxanes contained in silicone fluid.

To eliminate the troubles caused by low molecular weight siloxanes, there were proposed several methods including: (1) removing low molecular weight siloxanes from silicone fluid at high temperature in vacuum, (2) restricting the range of available voltage and current loading conditions (Japanese Patent Application Kokai No. 209266/1986), and (3) introducing a special organic fluorine compound having a certain vapor pressure into silicone fluid (Japanese Patent Application Kokai Nos. 104656/1989 and 109615/1989). These methods, however, have some problems. Method (1) has been used in practice, but the cost is high. Method (2) entails a lowering in the capacity of electric and electronic equipment. Method (3) is less effective in that the silicone fluid will volatilize under open service conditions and the fluorine compound added is expensive.

SUMMARY OF THE INVENTION

An object of the present invention is to provide an electric contact failure-proof oil which is improved in preventing occurrence of electric contact failure in a variety of elements such as relays, switches, motors and corotrons without adverse influence on their life and reliability.

Another object of the present invention is to provide a method for preventing occurrence of electric contact failure in an electric or electronic part.

According to the present invention, there is provided an electric contact failure-proof oil comprising a silicone fluid of the general unit formula (1):

$$R_a^1 R_b^2 SiO_{(4-a-b)/2} \tag{1}$$

wherein $R^1$ is $-R^3NH_2$ or $-R^3-NHR^4-NH_2$ wherein $R^3$ and $R^4$ each are an alkylene group having 1 to 8 carbon atoms, $R^2$ is a monovalent hydrocarbon group having 1 to 6 carbon atoms, and letters a and b are $0.0001 \leq a \leq 0.01$ and $1.95 \leq a+b \leq 2.20$. The silicone fluid has an amine equivalent of 10,000 to 200,000 g/mol and a viscosity of 10 to 100,000 centistokes (cs) at 25° C. The amino-modified silicone fluid having a limited content of amino groups is effective in preventing an electric contact failure which is otherwise caused by low molecular weight siloxanes, thus minimizing the occurrence of electric contact failure in relays, switches, motors and corotrons. This amino-modified silicone fluid has heat resistance at least comparable to that of conventional dimethylsilicone fluids.

The present invention also provides a method for preventing occurrence of electric contact failure in an electric or electronic part by using the above-defined electric contact failure-proof oil.

Although the reason why the amino-modified silicone fluid is effective in preventing an electric contact failure is not well understood, it is presumed that the amino group undergoes pyrolysis to form ammonia or amino group-containing cyclic oligomers which is adsorbed and coated on the surface of electric contact metal whereupon electric energy causes low molecular weight siloxanes to convert into silica, thereby preventing the silicone fluid from decomposing and adhering to the electric contact surface.

DETAILED DESCRIPTION OF THE INVENTION

According to the present invention, the electric contact failure-proof oil is defined as comprising a silicone fluid of the general formula (1).

$$R_a^1 R_b^2 SiO_{(4-a-b)/2} \tag{1}$$

In formula (1), $R^1$ is $-R^3-NH_2$ or $-R^3-NHR^4-NH_2$ wherein $R^3$ and $R^4$, which may be identical or different, are selected from alkylene groups having 1 to 8 carbon atoms, preferably 2 or 3 carbon atoms.

$R^2$ is monovalent hydrocarbon group having 1 to 6 carbon atoms and is contained in a molecule as attached to a silicon atom. Examples of the monovalent hydrocarbon group include alkyl groups such as methyl ethyl, propyl, butyl and hexyl groups, cycloalkyl groups such as cyclopentyl and cyclohexyl groups, aryls groups such as a phenyl group, and halogenated alkyl groups such as trifluoropropyl and nonafluoroalkyl groups, with the methyl group being preferred.

Letters a and b are positive numbers satisfying $0.0001 \leq a \leq 0.01$ and $1.95 \leq a+b \leq 2.20$. If a is less than 0.0001, the silicone fluid is less effective for preventing electric contact failure. If a is greater than 0.01, the silicone fluid is low in electric contact failure prevention and heat resistance.

It is critical that the silicone fluid contains an amino group such that the amine equivalent is in the range of 10,000 to 200,000 g/mol, preferably 50,000 to 150,000 g/mol. Outside this amine equivalent range, the silicone fluid is less effective for preventing electric contact failure.

The silicone fluid should also have a viscosity of 10 to 100,000 cs at 25° C., preferably 100 to 60,000 cs. With a viscosity of lower than 10 cs which implies a higher content of volatile matter which will volatilize during service at high temperature, the silicone fluid cannot remain effective over a long time, allowing early occurrence of an electric contact failure. Silicone fluids having a viscosity in excess of 100,000 cs are less stretchable so that they are low in initial releasability when used as a mold release agent, for example.

The organopolysiloxane or silicone fluid of the general unit formula (1) may have a linear, branched or cyclic structure, with linear ones being preferred in most cases. Preferred organopolysiloxanes are of the average compositional formula (2) shown below. Letter m is a positive number of 8 to 1500 and n is a positive number of 0.0002 to 30.

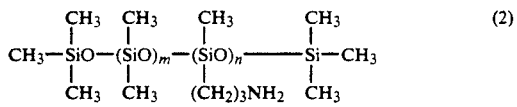
(2)

The silicone fluid may be prepared, for example, by using trimethylsiloxy-terminated polydimethylsiloxane, octamethylcyclotetrasilocane or methylaminopropylpolysiloxane as a starting reactant, polymerizing the reactant at high temperatures in the presence of basic catalysts, and removing low molecular weight siloxanes to an acceptable level by nitrogen purged, high temperature, vacuum stripping. In this regard, the content of low molecular weight siloxanes represented by equation (A) to be described later should preferably be 10,000 ppm or less, more preferably 3,000 ppm or less.

For removing low molecular weight siloxanes, it is preferable to strip off the low molecular weight siloxanes from the silicone fluid under a reduced pressure of 5 mmHg or less at a temperature of 280° to 320° C., preferably 290° to 310° C. for 6 to 10 hours, preferably 7 to 10 hours while bubbling the silicone fluid with nitrogen gas.

The oil of the invention comprising the above-defined silicone fluid is applied to an electric contact portion in various electric and electronic equipment having motors, relays, switches and corotrons build therein where it is fully effective in preventing an electric contact failure which is otherwise caused by low molecular weight siloxanes. For example, the oil of the invention may be used for motors by impregnating the oil in a bearing thereof or for corotrons as a fuser oil. Therefore, the oil of the invention is a useful moisture resistant, insulating, cooling and/or lubricating oil for use in electric and electronic equipment.

EXAMPLE

Examples of the present invention are given below by way of illustration and not by way of limitation.

EXAMPLES 1-5 & COMPARATIVE EXAMPLES 1-3

Oils comprising the following amino-containing organopolysiloxanes (Examples 1-5 and Comparative Examples 1-2) and dimethylpolysiloxane (Comparative Example 3) were evaluated for their ability to prevent an electric contact failure.

Example 1: Organopolysiloxane of average compositional formula (3). It contained a γ-aminopropyl group and had an amine equivalent of 36,000 g/mol, a low molecular weight siloxane content of 7500 ppm as represented by equation (A), and a viscosity of 310 cs at 25° C.

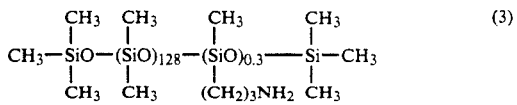
(3)

Low molecular weight siloxane content:

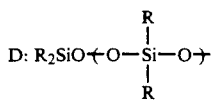
(A)

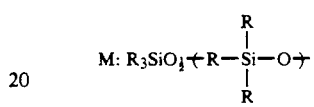

Example 2: Organopolysiloxane of average compositional formula (4). It contained a γ-aminopropyl group and had an amine equivalent of 97,000 g/mol, a low molecular weight siloxane content of 5700 ppm as represented by equation (A), and a viscosity of 311 cs at 25° C.

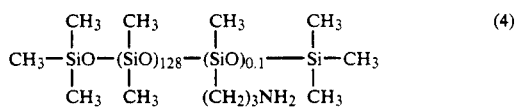
(4)

Example 3: Organopolysiloxane of average compositional formula (5). It contained a γ-aminopropyl group and had an amine equivalent of 200,000 g/mol, a low molecular weight siloxane content of 6300 ppm as represented by equation (A), and a viscosity of 307 cs at 25° C.

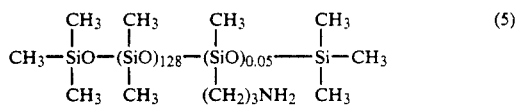
(5)

Example 4: Organopolysiloxane of average compositional formula (6). It contained an N-β-aminoethyl-γ-aminopropyl group and had an amine equivalent of 35,000 g/mol, a low molecular weight siloxane content of 6700 ppm as represented by equation (A), and a viscosity of 300 cs at 25° C.

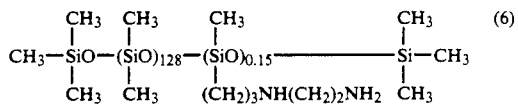
(6)

Example 5: Organopolysiloxane of average compositional formula (7). It contained an N-β-aminoethyl-γ-aminopropyl group and had an amine equivalent of 100,000 g/mol, a low molecular weight siloxanes content of 6200 ppm as represented by equation (A), and a viscosity of 315 cs at 25° C.

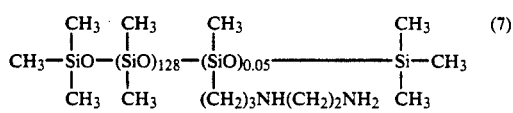

(7)

Comparative Example 1: Organopolysiloxane of average compositional formula (8). It contained a γ-aminopropyl group and had an amine equivalent of 6,300 g/mol, a low molecular weight siloxane content of 84,000 ppm as represented by equation (A), and a viscosity of 320 cs at 25° C.

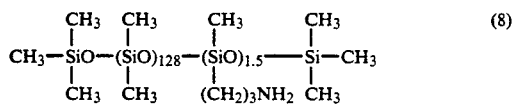

(8)

Comparative Example 2: Organopolysiloxane of average compositional formula (9). It contained a γ-aminopropyl group and had an amine equivalent of 370,000 g/mol, a low molecular weight siloxane content of 7000 ppm as represented by equation (A), and a viscosity of 305 cs at 25° C.

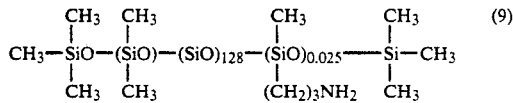

(9)

Comparative Example 3: Dimethylpolysiloxane of average compositional formula (10). It had a low molecular weight siloxane content of 6500 ppm as represented by equation (A) and a viscosity of 290 cs at 25° C.

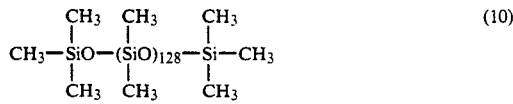

(10)

The organosiloxanes of Examples and Comparative Examples were obtained by stripping off the low molecular weight siloxanes in the conditions shown in Table 1 from each organopolysiloxanes containing a considerable amount of low molecular weight siloxanes.

TABLE 1

| | Initial content of low molecular weight polysiloxane | Stripping condition | | | | Final content of low molecular weight polysiloxane |
|---|---|---|---|---|---|---|
| | | Temperature (°C.) | Time (Hr.) | Pressure (mmHg) | $N_2$ gas bubbling | |
| Example 1 | 143000 ppm | 310 | 6 | 5 | o | 7500 ppm |
| Example 2 | 145000 ppm | 320 | 10 | 5 | o | 5700 ppm |
| Example 3 | 147000 ppm | 300 | 6 | 4 | o | 6300 ppm |
| Example 4 | 145000 ppm | 280 | 8 | 3 | o | 6700 ppm |
| Example 5 | 150000 ppm | 280 | 8 | 4 | o | 6200 ppm |
| Comparative Example 1 | 160000 ppm | 200 | 8 | 5 | o | 84000 ppm |
| Comparative Example 2 | 157000 ppm | 300 | 6 | 5 | o | 7000 ppm |
| Comparative Example 3 | 155000 ppm | 300 | 6 | 4 | o | 6500 ppm |

Each of the organopolysiloxane or electric contact failure-proof oils was subjected to a micro-motor accelerated durability life test by charging a container having a volume of 5 liters with the oil, closing the container, and maintaining the container in a dryer of hot air circulation type at 80° C. Measurement was done by tracking the waveform of motor current by means of an oscilloscope, and judging that an electric contact failure occurred when the waveform was disordered. The results are shown in Table 2.

TABLE 2

| | Electric contact failure prevention | | | |
|---|---|---|---|---|
| | 80° C./ 72 hr | 80° C./ 168 hr | 80° C./ 240 hr | 80° C./ 336 hr |
| Example 1 | OK | OK | OK | failed |
| Example 2 | OK | OK | OK | OK |
| Example 3 | OK | OK | OK | failed |
| Example 4 | OK | OK | failed | failed |
| Example 5 | OK | OK | OK | failed |
| Comparative Example 1 | OK | failed | failed | failed |
| Comparative Example 2 | OK | failed | failed | failed |
| Comparative Example 3 | failed | failed | failed | failed |

There has been described an electric contact failure-proof oil which is improved in preventing occurrence of electric contact failure in a variety of elements such as relays, switches, motors and corotrons while ensuring a long life and high reliability for the elements.

We claim:

1. An electric contact failure-proof oil comprising a silicone fluid of the general unit formula (1):

$$R_a^1 R_b^2 SiO_{(4-a-b)/2} \quad (1)$$

wherein $R^1$ is $-R^3-NH_2$ or $-R^3-NHR^4-NH_2$ wherein $R^3$ and $R^4$ each are an alkylene group having 1 to 8 carbon atoms, $R^2$ is a monovalent hydrocarbon group having 1 to 6 carbon atoms, and letters a and b are $0.0001 \leq a \leq 0.01$ and $1.95 \leq a+b \leq 2.20$, having an amine equivalent of 10,000 to 200,000 g/mol and a viscosity of 10 to 100,000 centistokes at 25° C.

2. A method of preventing occurrence of electric contact failure in an electric or electronic part comprising applying to an electric contact portion in the electric or electronic part an electric contact failure-proof oil comprising a silicone fluid of the general unit formula (1):

$$R_a^1 R_b^2 SiO_{(4-a-b)/2} \quad (1)$$

wherein $R^1$ is $-R^3-NH_2$ or $-R^3-NHR^4-NH_2$ wherein $R^3$ and $R^4$ each are an alkylene group having 1 to 8 carbon atoms, $R^2$ is a monovalent hydrocarbon group having 1 to 6 carbon atoms, and letters a and b are $0.0001 \leq a \leq 0.01$ and $1.95 \leq a+b \leq 2.20$, having an amine equivalent of 10,000 to 200,000 g/mol and a viscosity of 10 to 100,000 centistokes at 25° C.

3. The oil according to claim 1, wherein $R^3$ is an alkylene group having 2 to 3 carbon atoms.

4. The oil according to claim 3, wherein $R^4$ is an alkylene group having 2 or 3 carbon atoms.

5. The oil according to claim 1, wherein $R^2$ is selected from the group consisting of methyl, ethyl, propyl, butyl, hexyl, cyclopentyl, cyclohexyl, and phenyl.

6. The oil according to claim 4, wherein $R^2$ is methyl.

7. The oil according to claim 1, wherein said silicone fluid has an amine equivalent in the range of 50,000 to 150,000 g/mol.

8. The oil according to claim 1, wherein said silicone fluid has a viscosity of 100 to 60,000 cs at 25° C.

9. The oil according to claim 8, wherein said silicone fluid has an amine equivalent in the range of 50,000 to 150,000 g/mol.

10. The oil according to claim 1, wherein the average compositional formula of said silicone fluid is represented by formula (2):

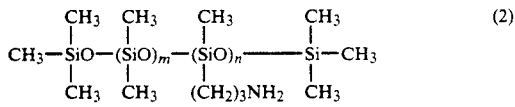

wherein m is a number in the range of 8 to 1500 and n is a number in the range of 0.0002 to 30.

11. The oil according to claim 1, wherein the average compositional formula of said silicone fluid is selected from the group consisting of:

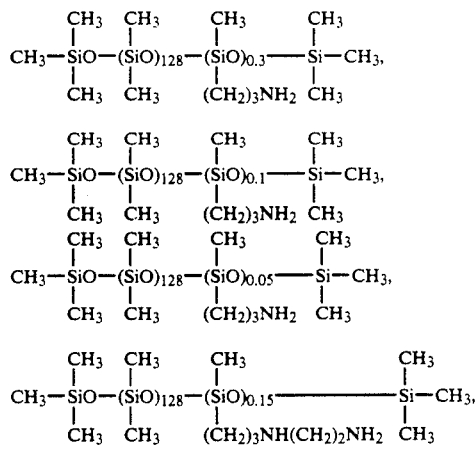

and

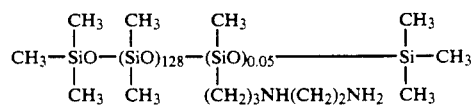

12. The method according to claim 2, wherein said electric of electronic part having said electric contact portion is selected from the group consisting of relays, switches, motors, and corotrons.

13. The method according to claim 2, wherein said silicone fluid has an amine equivalent in the range of 50,000 to 150,000 g/mol.

14. The method according to claim 2, wherein said silicone fluid has a viscosity in the range of 100 to 60,000 cs at 25° C.

15. The method according to claim 14, wherein said silicone fluid has an amine equivalent in the range of 50,000 to 150,000 g/mol.

* * * * *